(12) United States Patent
Ishidoya et al.

(10) Patent No.: US 6,624,427 B2
(45) Date of Patent: Sep. 23, 2003

(54) DOSIMETER GLASS ELEMENT, METHOD FOR MANUFACTURING SAME, AND DOSIMETER HOLDER

(75) Inventors: Tatsuyo Ishidoya, Fujieda (JP); Yasuyuki Minoura, Shizuoka (JP); Motoyuki Sato, Shizuoka (JP)

(73) Assignee: Asahi Techno Glass Corporation, Chiba (JP)

( * ) Notice: Subject to any disclaimer, the term of this patent is extended or adjusted under 35 U.S.C. 154(b) by 0 days.

(21) Appl. No.: 10/022,707

(22) Filed: Dec. 14, 2001

(65) Prior Publication Data

US 2003/0071229 A1 Apr. 17, 2003

(30) Foreign Application Priority Data

Sep. 4, 2001 (JP) .......................... 2001-267105
Sep. 4, 2001 (JP) .......................... 2001-267130

(51) Int. Cl.[7] .................................................. G01J 1/04
(52) U.S. Cl. .................................... 250/484.5; 250/328
(58) Field of Search .................... 250/328, 461.1, 250/472.1, 473.1, 484.2, 484.5; 65/269, 271, 276, 283, 284, 63, 65, 70, 77, 87

(56) References Cited

U.S. PATENT DOCUMENTS

| 4,128,411 | A | * | 12/1978 | Reisfeld et al. | ............... 65/32.5 |
|---|---|---|---|---|---|
| 4,377,751 | A | * | 3/1983 | Kronenberg et al. | ..... 250/472.1 |
| 4,722,607 | A | * | 2/1988 | Anselment et al. | ...... 250/461.1 |
| 4,725,388 | A | * | 2/1988 | Nelson et al. | ............... 422/942 |
| 4,922,115 | A | | 5/1990 | Mawatari et al. | ......... 250/484.1 |
| 5,637,876 | A | * | 6/1997 | Donahue et al. | .......... 250/474.1 |
| 5,651,804 | A | * | 7/1997 | Debnath | ..................... 65/30.13 |
| 6,268,602 | B1 | * | 7/2001 | Seiwatz et al. | ........... 250/473.1 |
| 6,352,949 | B1 | * | 3/2002 | Willems et al. | ............... 65/33.3 |

FOREIGN PATENT DOCUMENTS

| JP | 9118532 | 5/1997 |
|---|---|---|
| JP | 9222481 | 8/1997 |

\* cited by examiner

*Primary Examiner*—G. Bradley Bennett

(57) ABSTRACT

A cylindrical silver-activated phosphate glass base material 2 is placed inside a heater 1. The upper end of this base material 2 is set in a supporting section 3, and an extending section 4 provided in vertically movable fashion by means of a drive device is attached to the lower end thereof. As the base material 2 is softened by the heating of the heater 1, and the extending section 4 is lowered by operating the drive device, the base material 2 is extended and assumes a thin bar shape. The extension rate of the extending section 4 driven by the drive device is controlled by an external diameter control section 5, while detecting the external diameter, in such a manner that the external diameter of the extended portion is uniform. The extended portion 6 of the base material 2 is cut to uniform lengths, and the cut faces thereof are polished by a polishing device, thereby yielding a cylindrical dosimeter glass element 7a.

15 Claims, 10 Drawing Sheets

6

7a (A)  (B)  (C)

(A)  (B)  (C)

DOSIMETER GLASS ELEMENT, METHOD FOR MANUFACTURING SAME, AND DOSIMETER HOLDER

BACKGROUND OF THE INVENTION

The present invention relates to a dosimeter glass element which generates fluorescence corresponding to the radiation exposure dose thereof upon excitation by ultraviolet light, and more particularly, to a small-sized bar-shaped dosimeter glass element, a method for manufacturing same, and a dosimeter holder suitable for accommodating a small-sized dosimeter glass element.

In the installation and operation of facilities such as nuclear reactors, accelerators, X-ray generators, and radio isotopes, it is necessary to achieve complete safety in radiation management, in order to protect human beings from radioactivity. In particular, management must be provided to ensure that the radiation dose to which the employees working in various fields in the aforementioned facilities, and the users of the facilities, are exposed comes within a prescribed tolerance range. Dosimeters are used for radiation management of this kind. These dosimeters are located in prescribed locations within a facility, and/or are carried by employees and users, and by reading out the respective exposure doses thereof at regular intervals, it is possible to manage the radiation doses to which employees and users are exposed.

One type of generally used dosimeter is a fluorescent glass dosimeter. In general, a fluorescent glass dosimeter uses glass elements made from phosphate glass containing silver ions. After being irradiated with radiation and activated, these glass elements generate a phenomenon (radio photo luminescence: RPL) whereby they produce fluorescence when excited by ultraviolet radiation of wavelength 300–400 nm. Since the intensity of the fluorescence produced is directly proportional to the radiation exposure dose received by the glass element, it is possible to measure the radiation exposure dose by detecting the intensity of the fluorescence. A particular feature of fluorescent glass dosimeters of this kind is that they can be read out repeatedly, without the core which generates RPL being destroyed by the reading operation.

In recent years, small-sized fluorescent glass dosimeters have been used in dose evaluation for radiation therapy and diagnosis, dose measurement in animal experiments, precise dose distribution measurement and other various types of experiments, and the like. In measurement using small-sized fluorescent glass dosimeters of this kind, the dosimeter glass elements used are very small bar-shaped members. Conventionally, these dosimeter glass elements are fabricated by taking a silver-activated phosphate glass base material that has been formed by melting into a block shape, slicing it into square bar shapes slightly larger than the final shape, and then polishing all the faces thereof until it assumes the final shape. When fabricating a cylindrical glass element, after slicing to a square bar shape slightly larger than the final shape, it is then processed to achieve a circular bar shape, whereupon all faces thereof are polished to achieve the final shape.

However, in the conventional method for manufacturing a fluorescent glass element described above, since the material is melted to form a block shape, then sliced into square bar shapes, and then polished on all faces to assume the final shape, the number of processes is large, and the manufacturing time and manufacturing costs are considerable. The process of polishing on all faces, in particular, leads to increased labour and cost.

Moreover, the small-sized fluorescent glass dosimeter described above is normally positioned on a measurement object in a state where the fluorescent glass element is accommodated in a dosimeter holder. This dosimeter holder is generally a tubular vessel having a cap and bearing a holder ID which is the same as the identification ID applied to the fluorescent glass element, marked on the surface thereof. When a fluorescent glass dosimeter is accommodated in a dosimeter holder of this kind, placed on a measurement object, and then irradiated locally by radiation, for example, irradiated by a spot of approximately 1 mm diameter, the range of the fluorescent glass element therein that is exposed to radiation must match the range of fluorescence reading performed by the fluorescence reading device.

However, with a conventional dosimeter holder, it has not been possible to confirm, from an external position, the central position of the fluorescence reading range of the fluorescent glass element accommodated in the dosimeter holder, and hence it has not been possible to tell if the radiation exposure range and the fluorescence reading range can be matched by positioning the holder on the measurement object using a point of the dosimeter holder as a reference. Moreover, since the fluorescence reading range of the fluorescent glass element accommodated inside the dosimeter holder cannot be told, it has not been possible to match the position of radiation exposure, by an experiment lamp, or the like, accurately, with the fluorescence reading range. Consequently, in some cases, divergence occurs between the radiation exposure range and the fluorescence reading range, and hence the irradiated amount of radiation cannot be measured accurately.

The present invention has been devised with a view to resolving the aforementioned problems of the prior art, a first object thereof being to provide a dosimeter glass element and method for manufacturing same, whereby a dosimeter glass element can be manufactured by a small number of steps, in a short period of time, and at low cost.

Moreover, it is a second object of the present invention to provide a dosimeter holder whereby positioning in a measurement object can be performed readily and accurately, in such a manner that the position of radiation exposure can be matched to the position at which the fluorescence of the dosimeter glass element accommodated in the dosimeter holder is read out.

SUMMARY OF THE INVENTION

In order to achieve the first object, the present invention provides a method for manufacturing a dosimeter glass element which generates fluorescence corresponding to the radiation exposure dose thereof upon excitation by ultraviolet light, comprising: heating and extending a cylindrical glass base material to assume a prescribed outer diameter, and then cutting it to prescribed lengths, and polishing the cut faces thereof.

According to this method, since the cylindrical dosimeter glass element can be manufactured by heating and extending a cylindrical glass base material, it is possible to manufacture a dosimeter glass element by a smaller number of manufacturing steps, in a short period of time, and at low cost, compared to cases where it is manufactured by polishing on all faces thereof, as in the prior art. Moreover, since the dosimeter glass element is extended in a circular bar shape, the diameter thereof does not change even if it twists during forming, and hence forming accuracy is improved.

In order to achieve the second object, the present invention provides a dosimeter holder provided so as to be able to accommodate internally a dosimeter element which generates fluorescence corresponding to the radiation exposure dose thereof, comprising: an indication of a fluorescence reading position of said dosimeter element being provided on the outer surface of the dosimeter holder.

According to this dosimeter holder, since the fluorescence reading position is indicated on the outer face of the dosimeter holder, it is possible to position the holder on a measurement subject in such a manner that the dosimeter holder, and hence the dosimeter element, can be aligned with the radiation exposure range and the fluorescence reading range, by using the indication as a reference.

DETAILED DESCRIPTION

Below, embodiments of a dosimeter glass element, a method of manufacture for same, and a dosimeter holder, relating to the present invention, are described in concrete terms with reference to the drawings.

[A. Method for Manufacturing Dosimeter Glass Element]

(1) First Embodiment

Figure 1:
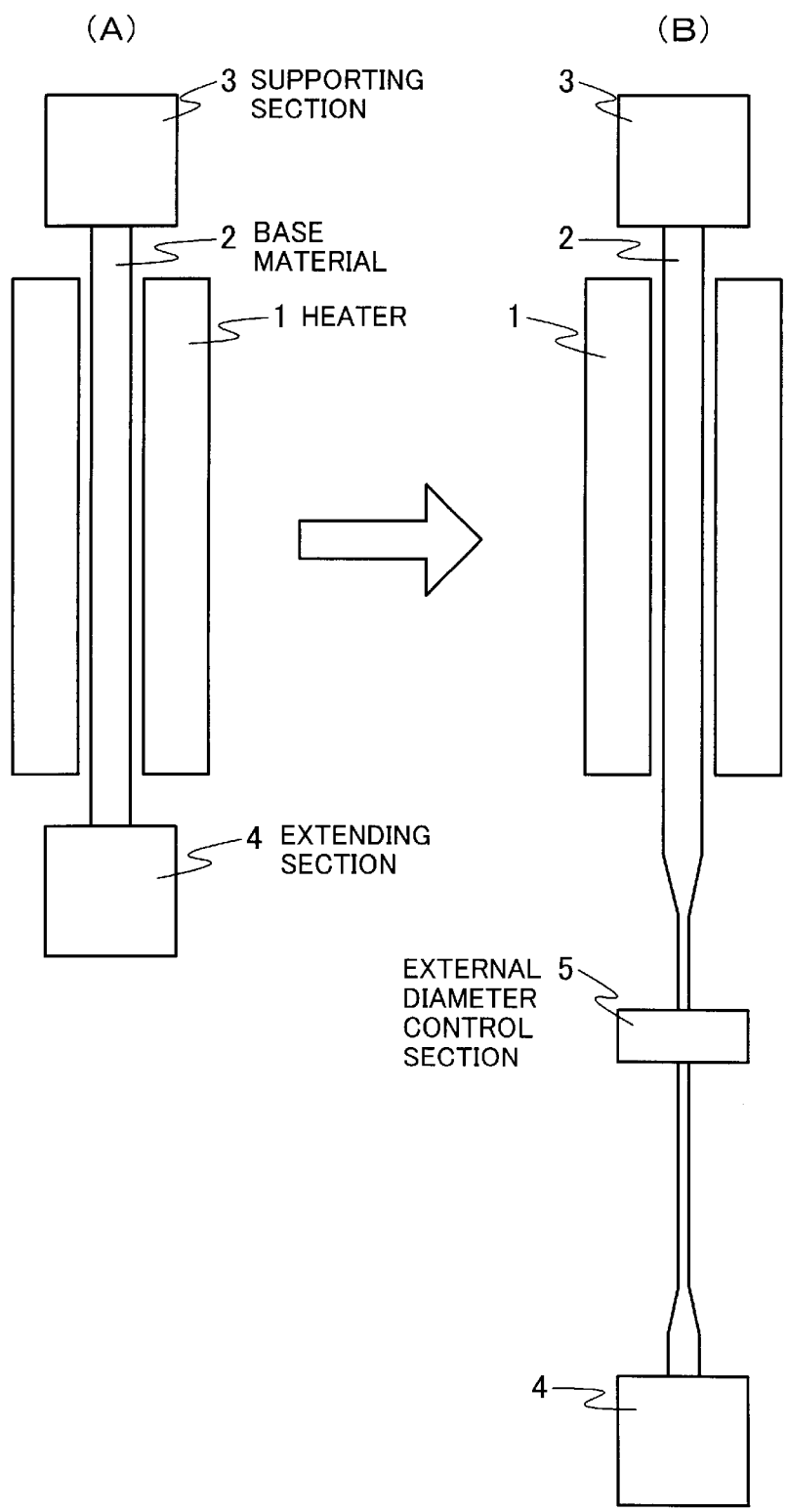
FIG. 1 is a side view of an embodiment of a method for manufacturing a dosimeter glass element according to the present invention, showing a state (A) before extension and (B) after extension.
Figure 2:
FIG. 2 is a side view showing a dosimeter glass element manufactured by means of the manufacturing method illustrated in FIG. 1.
Figure 2:
Figure 2:
Figure 2:
Figure 2:
Figure 2:
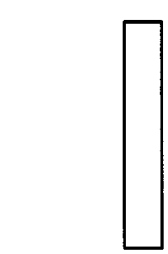

This embodiment relates to a method for manufacturing a cylindrical dosimeter glass element 7a from a cylindrical glass base material. In FIG. 1, numeral 1 is a heater, 2 is a base material, 3 is a base material supporting section, 4 is an base material extending section, and 5 is an external diameter control section. Moreover, in FIG. 2, 6 is a cut glass, and 7a is a cylindrical dosimeter glass element of which the cut faces have been polished.

The method for manufacturing a dosimeter glass element according to the present embodiment basically employs a commonly known redrawing process. Redrawing is a method for fabricating fine products by holding a preliminarily formed base material 2, in vertical fashion, and heating the end face of the base material 2 to lower the viscosity of the glass, whereby it extends downwards.

In other words, firstly, as shown in FIG. 1(A), a cylindrical base material 2 of silver-activated phosphate glass is placed in a heater 1. The upper end of this base material 2 is set in the supporting section 3, and an extending section 4 is attached to the lower end thereof. The extending section 4 is provided in vertically movable fashion, by means of a drive device (not illustrated). In this state, the base material 2 is heated and softened by the heater 1, and the extending section 4 is lowered by operating the drive device. By so doing, the base material 2 is extended and assumes a fine circular bar shape, as illustrated in FIG. 1(B). In order that the external diameter of the extended portion is uniform, the speed of extension of the extending section 4 by the drive device is controlled, while detecting the external diameter of the extended portion by means of the external diameter control section 5. Moreover, as shown in FIG. 2, the extended portion 6 of the base material 2 is cut to uniform lengths, and the cut faces thereof are polished by a polishing device, to obtain a cylindrical dosimeter glass element 7a.

This cylindrical dosimeter glass element 7a can be formed to a variety of sizes, by altering the conditions applied in the aforementioned manufacturing process. Here, an example is described of numerical conditions for forming a cylindrical dosimeter glass element 7a of 1.5 mm diameter. Namely, after melting the silver-activated phosphate glass and forming a glass block, a cylindrical base material having 23–27 mm diameter and 310 mm length is formed by grinding. By placing this base material in the extension forming device, heating the front end portion thereof to 630–658° C., and extending at an extension rate of 2.6 m per minute, a bar-shaped glass of 1.5 mm diameter can be obtained. In this case, the base material descends at a rate of 8 mm per minute.

According to this method for manufacturing a dosimeter glass element, since no polishing of the outer faces of the dosimeter glass element is required, it is possible to manufacture a product inexpensively, by a short number of manufacturing steps and in a short period of time. Furthermore, since it is extended in a circular bar shape, the diameter does not change even if the material is twisted during forming, and hence a merit is obtained in that forming accuracy is high. Moreover, since the dosimeter glass element has a circular bar shape, when it is to be used by accommodating it in a dosimeter holder, as described hereinafter, it can readily be processed to have, for example, an energy-compensating filter comprising a gap in the central portion thereof.

(2) Second Embodiment

This embodiment is a modification of the first embodiment described above, and relates to a method for manufacturing a prismatic dosimeter glass element 7b from a prismatic glass base material. In this embodiment, a prismatic silver-activated phosphate glass is used as the base material 2, and in place of the external diameter control section 5 of the first embodiment, a thickness control section for controlling the length of one edge of the square bar is used. Apart from this, the composition is the same as that of the first embodiment, and description thereof is omitted here.

Similarly to the first embodiment, the prismatic dosimeter glass element 7b obtained by the method for manufacturing a dosimeter glass element described above does not require grinding of the outer faces of the element, and hence a product can be manufactured inexpensively, by a short number of manufacturing steps and in a short period of time. Furthermore, even if there is variation in the point of incidence of the excitation ultraviolet laser beam on a respective plurality of dosimeter glass elements, due to a warp of the magazine holding the plurality of dosimeter glass elements, or for some other reason, this will not cause a change in the angle of refraction (lens efficiency), thereby providing a merit in that there is little variation in the reading sensitivity.

Figure 3:
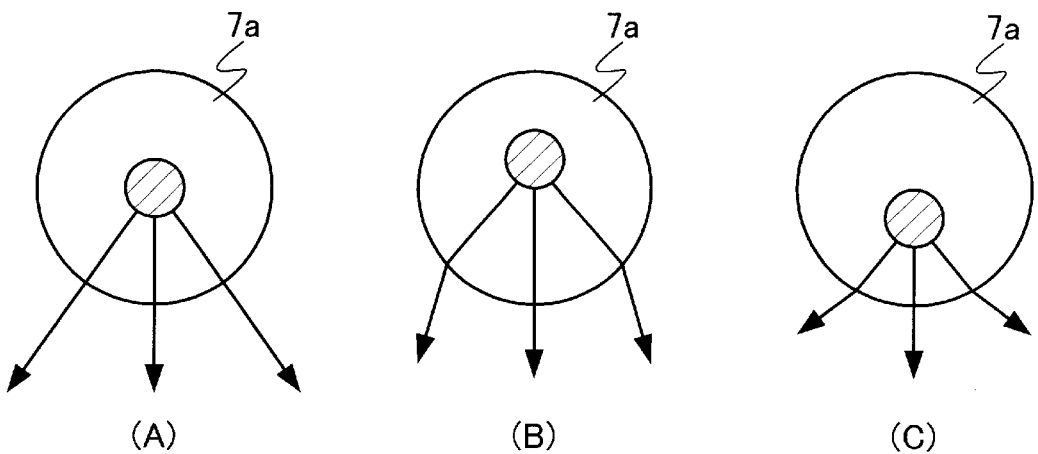
FIG. 3 is a diagram illustrating the position of laser light incident on a cylindrical dosimeter glass element and the angle of refraction of fluorescence generated, in cases where (A) the laser light is incident in a central position, (B) the laser light is incident towards the upper side, and (C) the laser light is incident towards the lower side.
Figure 4:
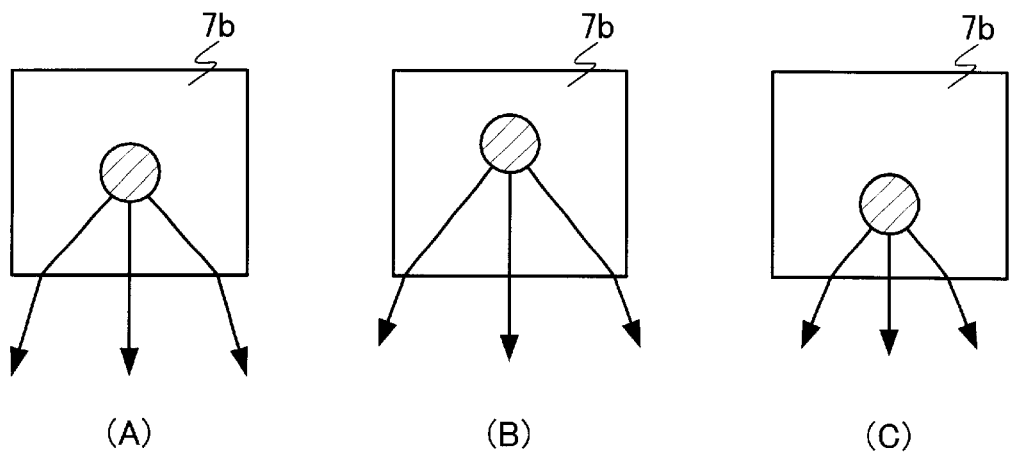
FIG. 4 is a diagram illustrating the position of laser light incident on a prismatic dosimeter glass element and the angle of refraction of fluorescence generated, in cases where (A) the laser light is incident in a central position, (B) the laser light is incident towards the upper side, and (C) the laser light is incident towards the lower side.

In other words, as shown in FIG. 3, in the case of a cylindrical dosimeter glass element 7a, the angle of refraction of the fluorescence will change, as indicated by the arrows, between cases where the ultraviolet laser beam is irradiated (A) onto the center of the circular bar, (B) above the center of the circular bar, and (C) below the center of the circular bar. However, as shown in FIG. 4, in the case of the prismatic dosimeter glass element 7b, there is no change in the angle of refraction of the fluorescence, as indicated by the arrows, between cases where the ultraviolet laser beam is irradiated (A) onto the center of the circular bar, (B) above the center of the circular bar, and (C) below the center of the circular bar. Consequently, there is little variation in reading sensitivity and high-precision measurement can be performed.

(3) Examples of Application of Dosimeter Glass Element

Examples of the application of a dosimeter glass element 7 fabricated as described above are described below.

(3-1) Dosimeter Holder

Figure 5:
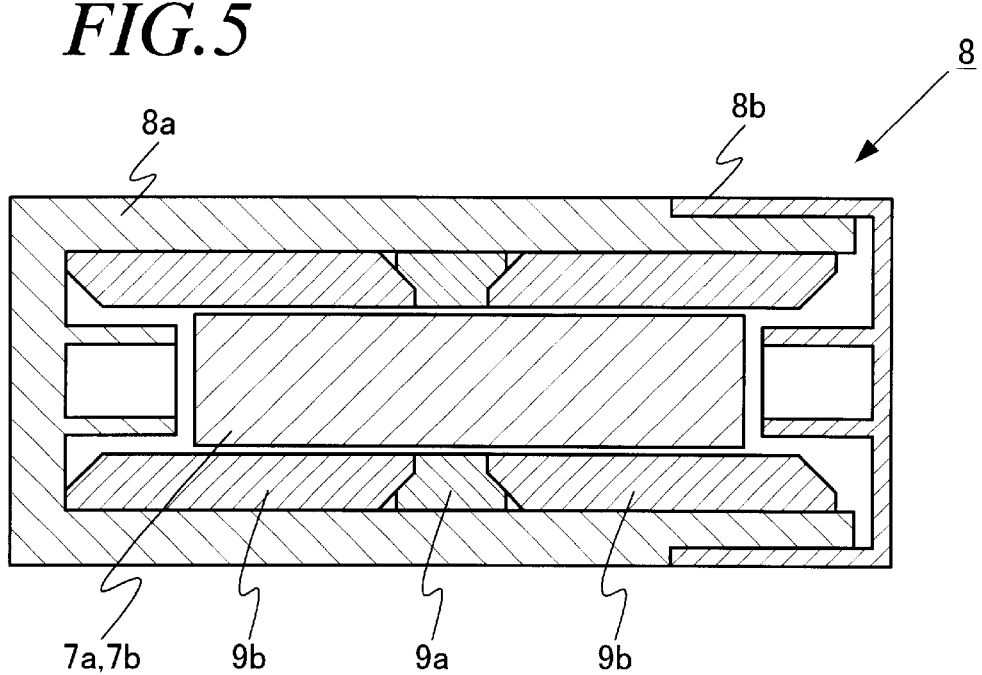
FIG. 5 is a sectional view showing one example of a dosimeter holder accommodating a dosimeter glass element as illustrated in FIG. 2.

A dosimeter glass element 7a, 7b obtained by the manufacturing method according to the present embodiments is accommodated in a dosimeter holder 8 as illustrated in FIG. 5, for example, and placed in a prescribed measurement position. More specifically, the dosimeter holder 8 is constituted by a bottomed tubular case 8a and a cap 8b. A ring-shaped spacer 9a is disposed inside the case 8a, in a position corresponding to the reading center of the dosimeter glass element 7a, 7b, and tubular-shaped energy compensating filters 9b made from tin are provided to the left and right-hand sides of the spacer 9a. A through hole having a circular or square cross section, such that it is able to hold the dosimeter glass element 7a, 7b inserted therein, is formed in the central portion of the spacer 9a and filter 9b. A detailed description of a dosimeter holder suitable for accommodating a small-sized dosimeter glass element relating to the present invention is given hereinafter.

(3-2) Magazine and Dose Reading Device

Figure 6:
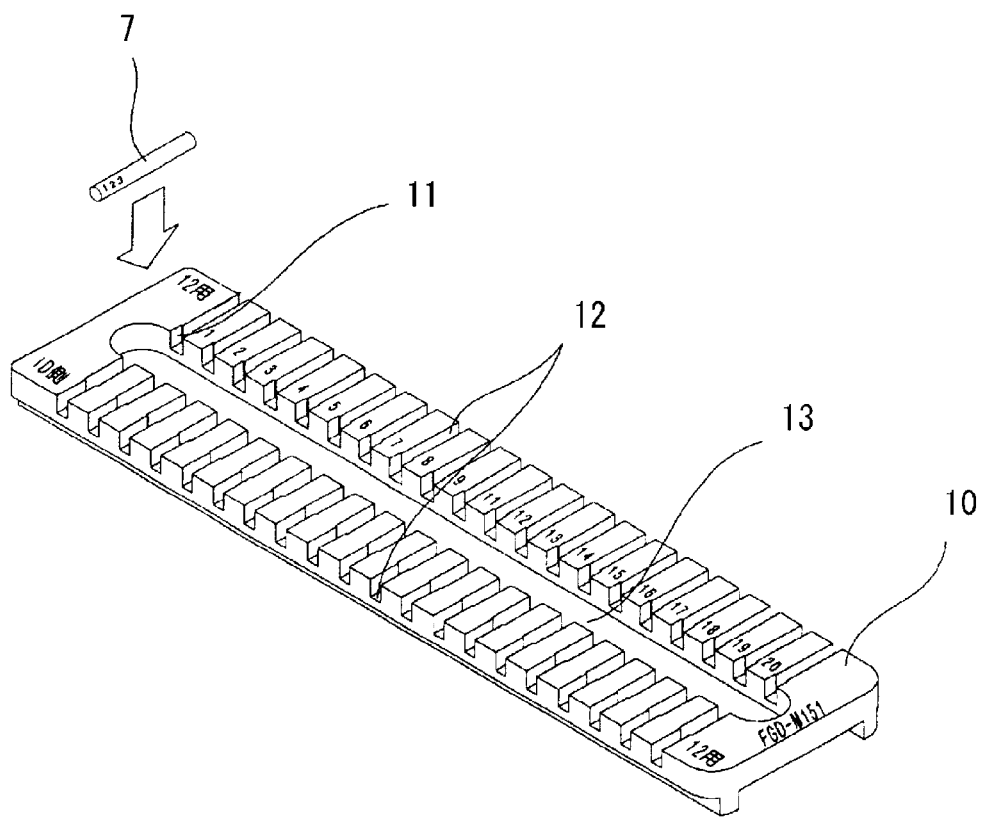
FIG. 6 is an oblique view showing one example of a magazine used when reading the radiation exposure dose of the dosimeter glass element in FIG. 2.

After exposure to radiation, the dosimeter glass element 7 accommodated in the dosimeter holder 8 as described above and placed in the prescribed measurement position is removed from the dosimeter holder 8 and exposure dose reading is performed. Firstly, the dosimeter glass element 7 is loaded in a magazine 10 as illustrated in FIG. 6. This magazine 10 comprises a multiplicity of loading sections 11, each consisting of recess-shaped grooves for horizontally mounting a plurality of dosimeter glass elements 7, arranged in parallel configuration with respect to the shorter edges of the magazine. Furthermore, cutaway sections 12 forming respective light paths are formed on the line of extension of each respective loading section 11, at either end thereof, in order that an ultraviolet laser beam can enter and exit therethrough. Moreover, an aperture window 13 spanning the plurality of dosimeter glass elements 7 is provided in the base side of the magazine 10.

Figure 7:
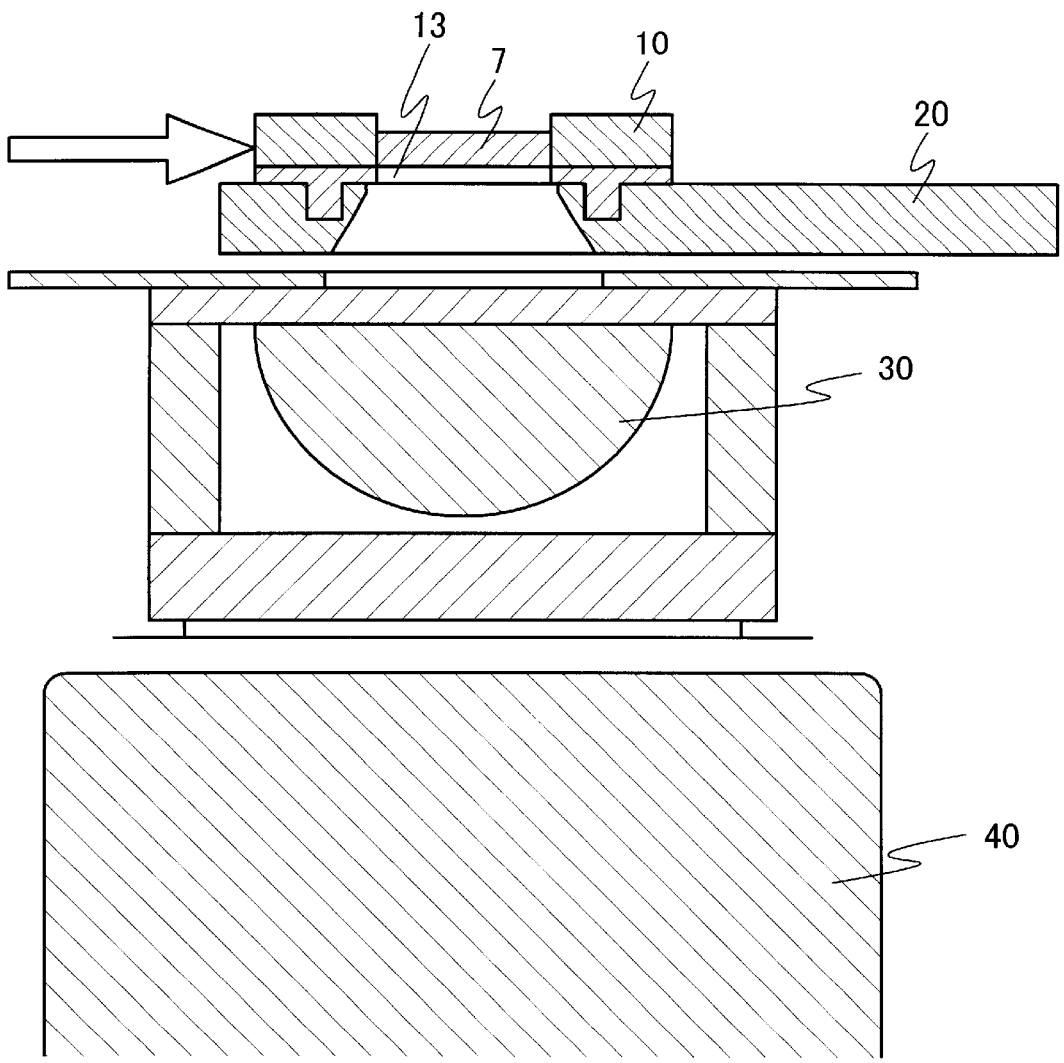
FIG. 7 is a sectional view showing one example of a dose reading device for reading in the radiation exposure dose of the dosimeter glass element in FIG. 2.

The magazine 10 having dosimeter glass elements 7 loaded in the loading sections 11 thereof is set in a dose reading device as illustrated in FIG. 7, and the radiation exposure dose thereof is read. More specifically, the magazine 10 loaded with the dosimeter glass elements 7 is placed on a moving table 20. Thereupon, ultraviolet light from an ultraviolet irradiation section (not illustrated) is input to the polished end face of a dosimeter glass element 7, in the axial direction thereof (indicated by the white arrow in the diagram). Accordingly, fluorescence generated by the dosimeter glass element 7 passes through the aperture window 13 of the magazine 10, is condensed by the condensing section 30, and is detected by an opto-electronic multiplier tube 40.

(4) Further Embodiments

The dosimeter glass element and method for manufacturing same relating to the present invention are not limited to the embodiments described above; for example, the size, shape, material, and the like, of the manufactured dosimeter glass element may be modified as appropriate. Moreover, the dosimeter holder and reading device used are not limited to those described in the foregoing embodiments.

[B. Dosimeter Holder]

(1) Composition

Figure 8:
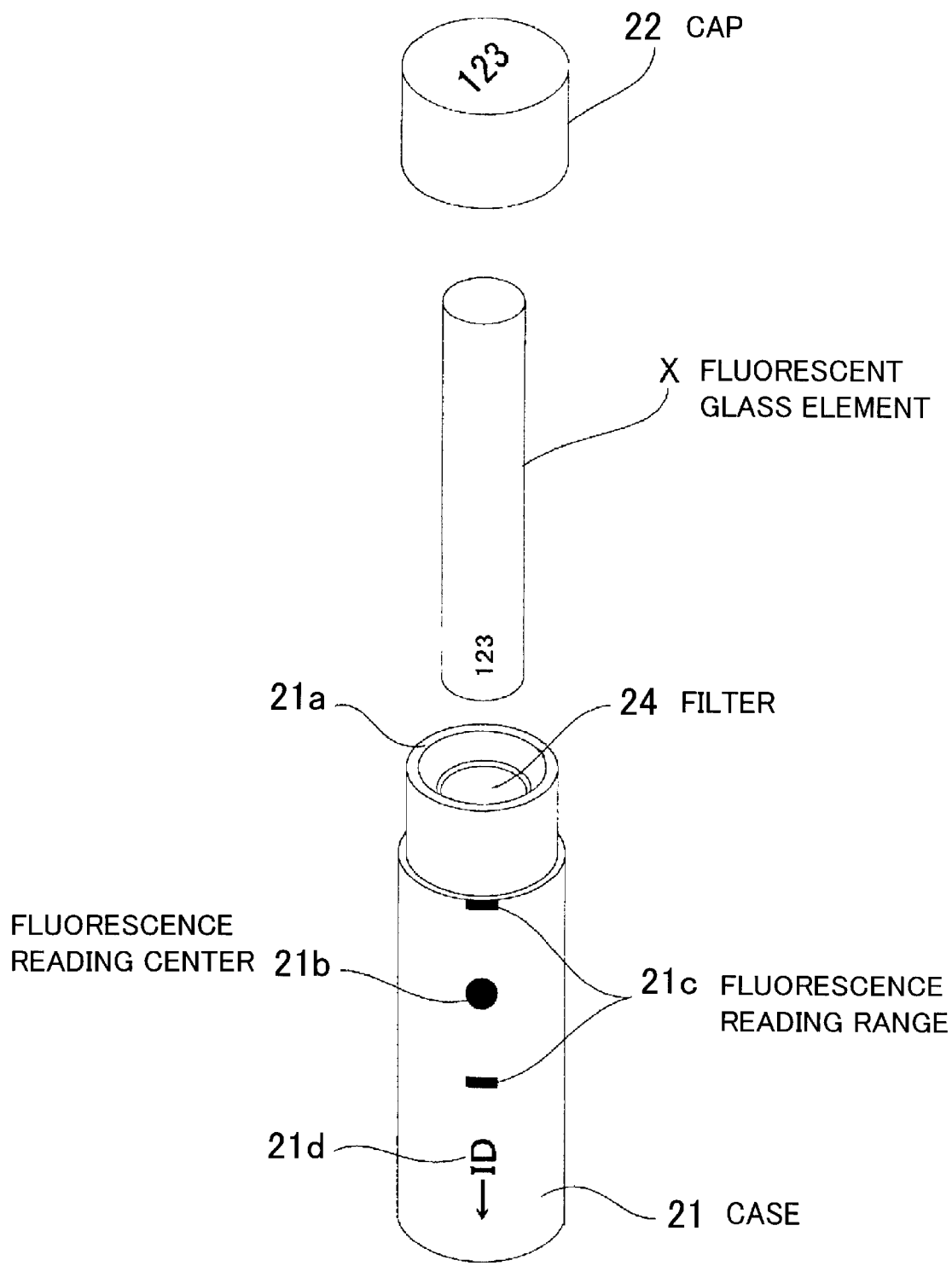
FIG. 8 is an oblique view showing the composition of an embodiment of a dosimeter holder relating to the present invention.
Figure 9:
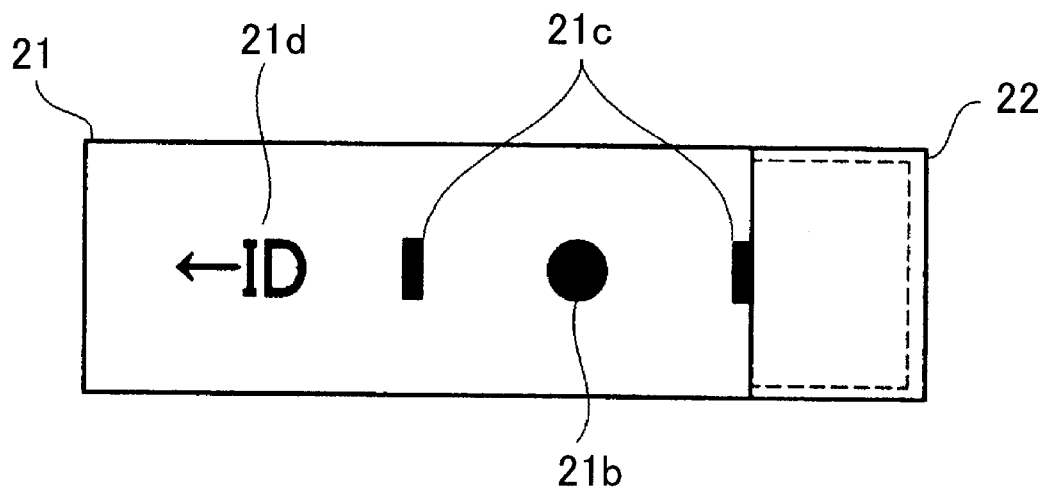
FIG. 9 is a side view showing the composition of the dosimeter holder illustrated in FIG. 8.

As shown in FIG. 8 and FIG. 9, the dosimeter holder according to the present invention is constituted by a bottomed tubular case 21 and a cap 22. This case 21 comprises an opening section 21a for inserting a fluorescent glass element X, provided in one end thereof, and is composed in such a manner that the case 21 can be sealed hermetically by fitting the cap 22 to the opening section 21a. Desirably, an ABS resin, for example, is used as the material for the case 21 and cap 22.

Moreover, a "●" mark and "=" marks are inscribed on the outer face of the case 21. The "●" mark is placed in a position corresponding to the fluorescence reading center 21b of the fluorescent glass element X accommodated therein, and the "=" marks are placed in positions corresponding to the respective ends of the fluorescence reading range 21c of the fluorescent glass element X. An arrow mark 21d for indicating the direction of insertion of the fluorescent glass element X is also marked on the outer face of the case 21, together with a holder ID that is the same as the identification ID marked on the fluorescent glass element accommodated in the holder. Desirably, an ink having high alcohol resistance, for example, is used for these markings. On the other hand, an ID corresponding to the identification ID marked on the fluorescent glass element X (in the diagram, "123") is inscribed on the upper face of the cap 22.

Figure 10:
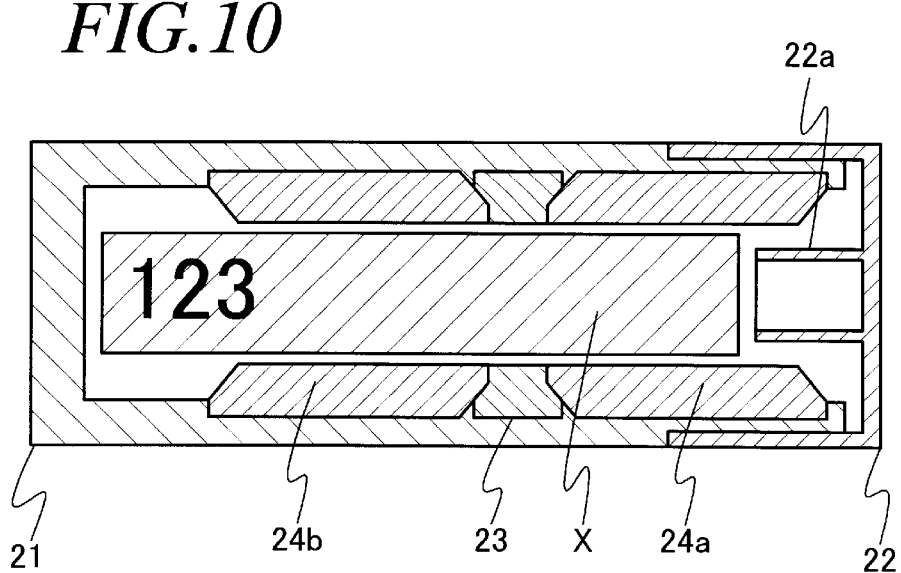
FIG. 10 is a side view showing the composition of the dosimeter holder illustrated in FIG. 8.

Moreover, as shown in FIG. 10, a ring-shaped spacer 23 is disposed inside the case 21, in a position corresponding to the fluorescence reading center 21b of the fluorescent glass element X, and tubular-shaped energy compensating filters 24 made from tin are disposed to either side of the spacer 23. This spacer 23 is provided in such a manner that it maintains a uniform positional spacing between the energy compensating filters 24 (for example, 1.5 mm±0.025 mm).

Moreover, either end portion of the aforementioned energy compensating filters 24 has a taper structure. In other words, the filter 24a disposed to the cap 22 side is formed with a taper on the end portion thereof adjacent to the holder opening, in order that the glass element can be inserted readily into the holder, while the opposite end portion thereof is formed with an outwardly broadening taper, in order that radiation which is incident obliquely onto the glass element in the holder can reach the glass element reliably. On the other hand, the filter 24b disposed to the bottom side of the holder is formed with an outward broadening taper on the end portion thereof facing the holder opening, in order that, similarly to the filter 24a, radiation, which is incident obliquely onto the glass element in the holder, can reach the glass element reliably. By means of this outwardly broadening taper, it is possible to adjust the dependence on the direction of the incident radiation. In the present embodiment, a taper is also formed on the end portion of the filter 24b on the side adjacent to the case bottom, in order to achieve component standardization of the filter 24a and filter 24b.

The spacer 23 and filters 4 have internal diameters which hold the fluorescent glass element X inserted therein, and the interior of the cap 22 is formed with a projection 22a for holding one end of the fluorescent glass element X accommodated in the holder.

(2) Action

The dosimeter holder according to the present embodiment having the composition described above is used in the following manner. Namely, as illustrated in FIG. 8, a fluorescent glass element X is inserted via the opening section 21a of the case 21, and as illustrated in FIG. 9, the cap 22 is fitted and sealed hermetically. Taking the fluorescence reading center 21b marking as a reference, the holder is placed in a prescribed position for measurement, in such a manner that the position of the marking matches the position of radiation exposure on the measurement object. Moreover, the fluorescence reading range 21c markings are taken as a reference for irradiating the radiation, and the like. After exposure to the radiation, the fluorescent glass element X is removed from the case 21 and reading by a fluorescence reading device is performed.

Figure 11:
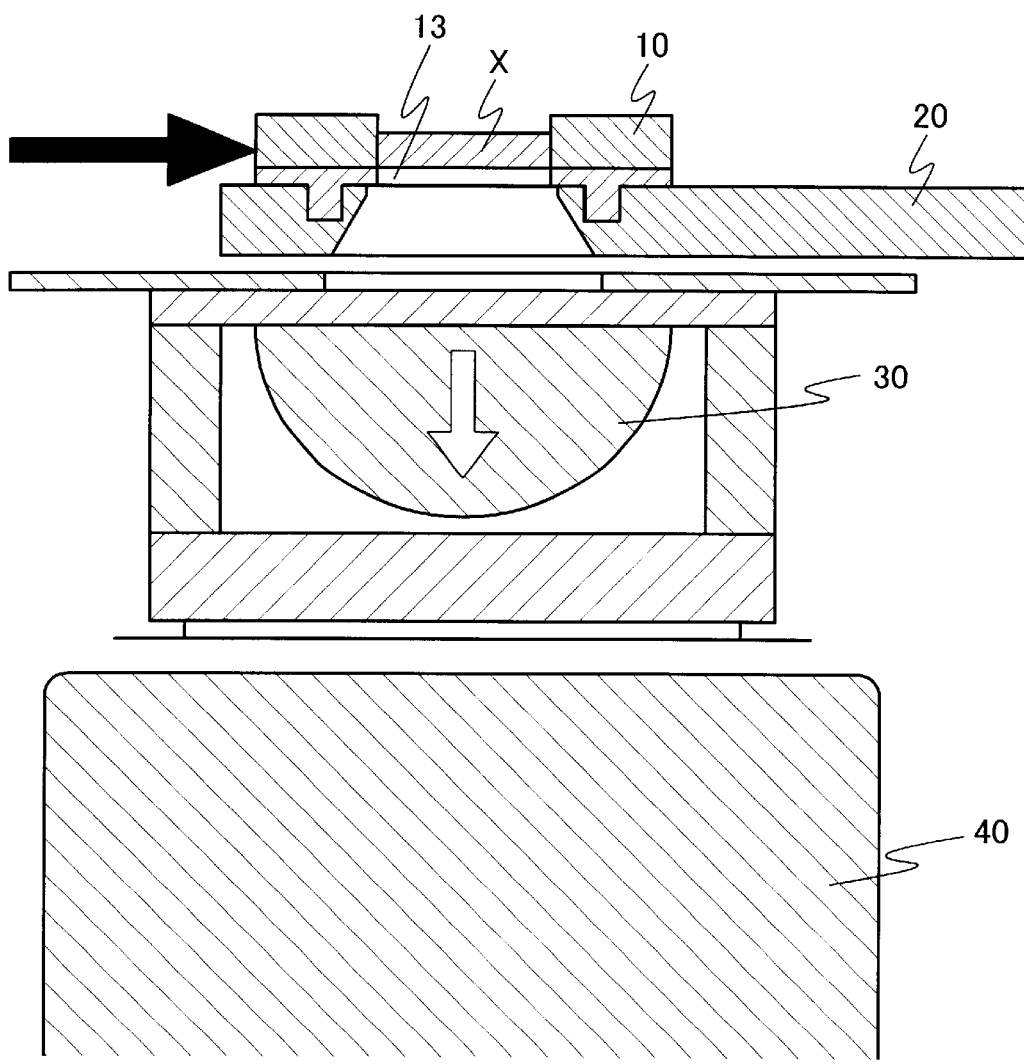
FIG. 11 is a vertical sectional view showing one example of a fluorescence reading device for fluorescent glass dosimeters.
Figure 12:
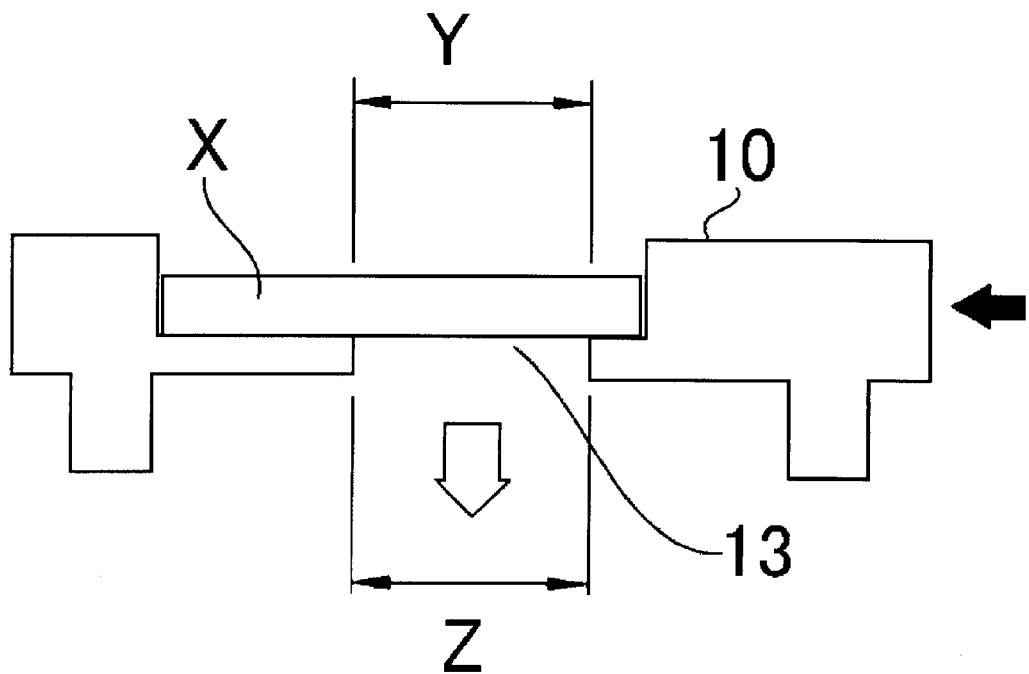
FIG. 12 is a schematic diagram showing an example wherein the radiation exposure range Y and the fluorescence reading range Z are in coinciding positions.

A device using a magazine 10 may be used for the aforementioned fluorescence reading device, for example, as shown in FIG. 11. An aperture window 13 for emitting the fluorescence generated by the fluorescent glass elements X to a fluorescence detecting section is formed in the base side of the magazine 10. The magazine 10 loaded with fluorescent glass elements X is placed on a moving table 20 and irradiated with ultraviolet light from an ultraviolet irradiating section (not illustrated). This ultraviolet light is incident on the end face of a fluorescent glass element X loaded in the magazine 10, in the axial direction thereof (indicated by black arrow in the diagram). Thereby, fluorescence is generated by the fluorescent glass element X, and this fluorescence (indicated by the white arrow in the diagram) passes through the aperture window 13, is condensed by the condensing section 30, and is detected by the opto-electronic multiplier tube 40. In this case, in order to perform accurate measurement, desirably, the radiation exposure range Y and the fluorescence reading range Z should be matching, as shown in FIG. 12.

Figure 13:
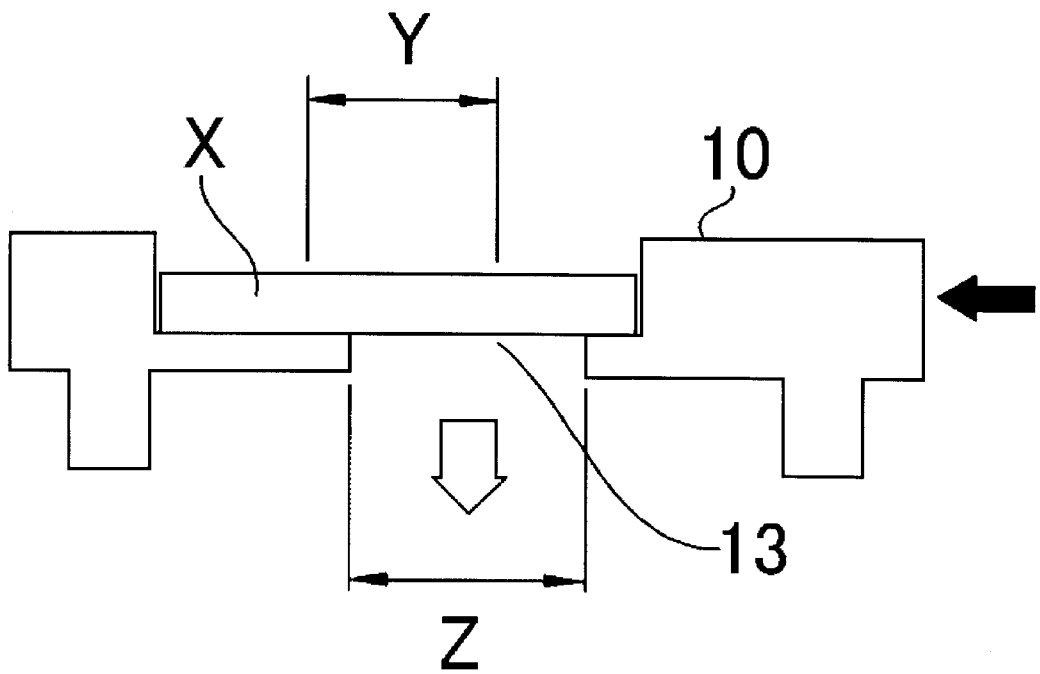
FIG. 13 is a schematic diagram showing an example wherein the radiation exposure range Y and the fluorescence reading range Z are in diverging positions.
Figure 14:
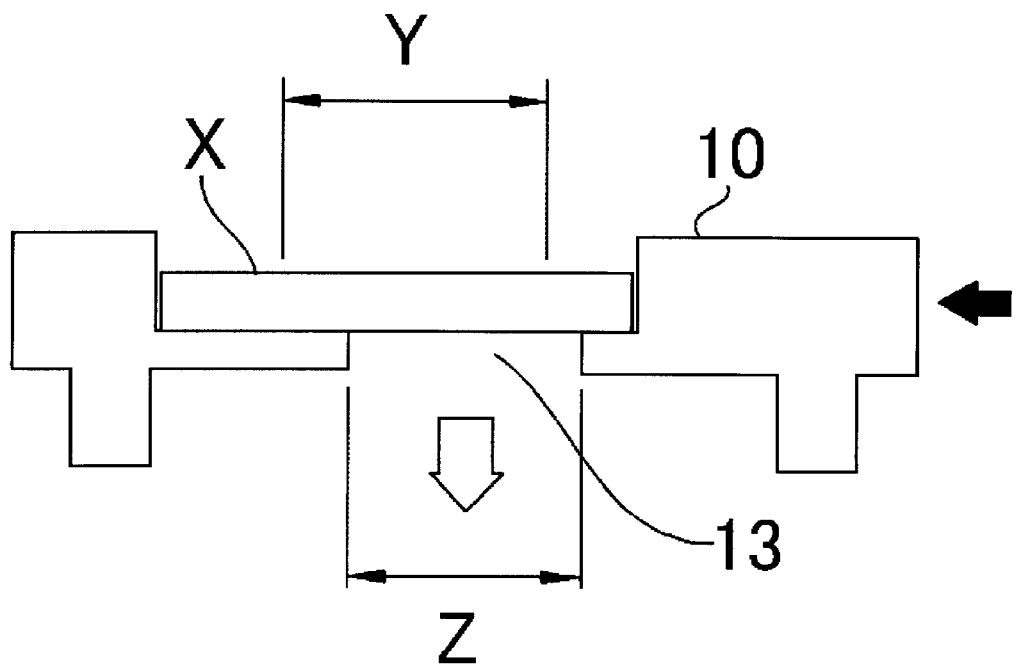
FIG. 14 is a schematic diagram showing an example wherein the radiation exposure range Y and the fluorescence reading range Z are in diverging positions.
Figure 15:
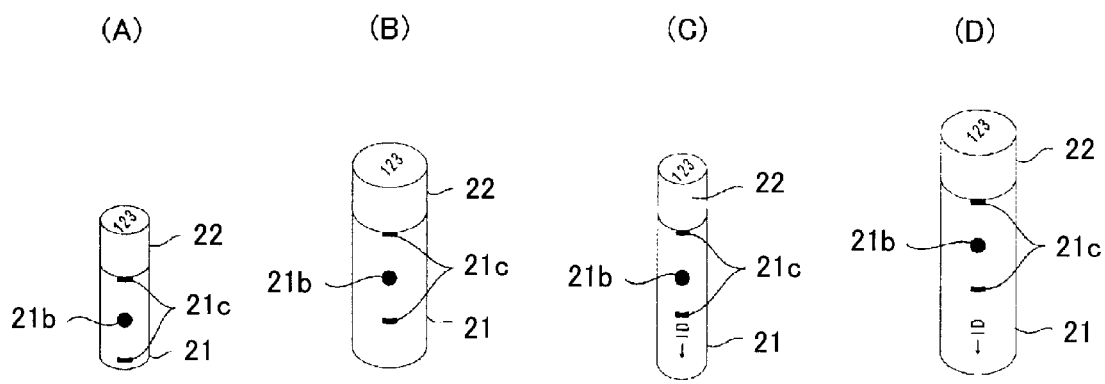
FIG. 15 is a schematic diagram showing embodiments of dosimeter holders of varying sizes.

In cases where, for example, not all of the radiation exposure range Y of the fluorescent glass element X is contained within the fluorescence reading range Z, even though the radiation exposure range Y is narrower than the fluorescence reading range Z, as illustrated in FIG. 13, or where a portion of the radiation exposure range Y of the fluorescent glass element X is not contained within the fluorescence reading range Z, as illustrated in FIG. 14, even though the radiation exposure range Y is broader than the fluorescence reading range Z, then the fluorescence reading dose will be less than the actual radiation exposure dose.

However, if a fluorescent glass element X is used by accommodating it in the dosimeter holder according to the present embodiment, it is possible to position the dosimeter holder, and hence the fluorescence reading range Z of the fluorescent glass element X, accurately, on the basis of the marks formed on the outer face of the dosimeter holder, in such a manner that it coincides with the range Y in which the measurement object is exposed to radiation.

(3) Merits

According to the dosimeter holder of the present embodiment described above, since the fluorescence reading center 21b and the fluorescence reading range 21c of the fluorescent glass element X in the dosimeter holder are indicated on the outer side of the case 21 of the dosimeter holder, the following beneficial effects are obtained. Namely, since the fluorescence reading center 21b of the fluorescent glass element X can be recognized from the outer side of the dosimeter holder, a clear reference is provided for positioning the holder on the measurement object, and hence simple and accurate positioning can be achieved. Moreover, since the fluorescence reading range 21c of the fluorescent glass element X can be recognized, the radiation exposure position, by means of an experiment lamp, or the like, can be determined readily and accurately. Furthermore, since the radiation exposure range Y and the fluorescence reading range Z can be made to coincide, it is possible to make accurate radiation exposure dose readings.

Since the marks for the fluorescence reading center 21b and the fluorescence reading range 21c are indicated using ink having a high alcohol resistance, it is possible to prevent the marks from being erased, even during use in a hospital, or the like. Since an ABS resin having high fluidity is used as the material for the dosimeter holder, it has excellent thin section formability characteristics, and hence it is possible readily to fabricate a dosimeter holder that is suitable for small-sized fluorescent glass elements X.

(4) Further Embodiments

The dosimeter holder relating to the present invention is not limited to the foregoing embodiments, and it may be modified as appropriate with regard to the size, shape, number, material, type, and the like, of the respective sections thereof. For example, the indications of the fluorescence reading center 21b and the fluorescence reading range 21c are not limited to ● or = symbols, and other figures, symbols, characters, or the like, may be used for same. There are no particular restrictions on the colour or type of ink that may be used for same. Moreover, the indication method is not limited to printing, and it is possible to use other methods, such as inscribing, or application of another member, or the like, which will not wear away even after prolonged use.

Furthermore, as shown in FIGS. 15(A)–(D), the dosimeter holder may be constructed having a variety of outer diameters and lengths, according to the fluorescent glass element X being used. Although varying dosimeter holders of this kind will have different reading positions for the fluorescent glass elements accommodated respectively therein, it is still possible to position the holder on the measurement object and perform radiation exposure, readily and accurately, on the basis of the marks for the fluorescence reading center 21b and the fluorescence reading range 21c indicated on the outer side of the holder.

The shape and material of the dosimeter holder are not limited to those described in the foregoing embodiments, and various dosimeter holders may be constructed, taking account of the shape, desired strength, weight, and the like, of the fluorescent glass elements. Moreover, the dose reading device used is not limited to that described in the foregoing embodiments.

Moreover, the dosimeter holder according to the present invention may also be used in a thermal luminescence dosimeter (TLD). This is a device which utilizes a thermal luminescence effect, wherein free electrons and protons are generated when a solid-state crystal created by doping with a prescribed impurity is exposed to radiation, and when heat is applied, the electrons are released from the trapping core and recouple with the protons, thereby emitting light. Within a certain dose range, there exists a direct proportional relationship between the amount of light generated by thermal luminescence, and the energy absorbed from radiation, and hence by measuring the amount of light generated upon heating of a solid-state crystal as described above, after it has been exposed to radiation, it is possible to determine the radiation dose incident thereon. If a solid-state crystal of this kind is accommodated in a dosimeter holder according to the present invention, positioned on a measurement object and exposed to radiation, whereupon a reading thereof is taken by a fluorescence reading device, similar action and effects to those described above will be obtained.

INDUSTRIAL APPLICABILITY

As described above, according to the present invention, it is possible to provide a dosimeter glass element and method of manufacturing same, whereby a dosimeter glass element can be manufactured by a small number of steps, in a short period of time, and at low cost.

Moreover, according to the present invention, it is possible to provide a dosimeter holder that can be positioned readily and accurately on a measurement object, in such a manner that the position exposed to radiation coincides with the fluorescence reading position of the dosimeter element accommodated therein.

What is claimed is:

1. A method for manufacturing a dosimeter glass element which generates fluorescence corresponding to the radiation exposure dose thereof upon excitation by ultraviolet light, comprising:

heating and extending a cylindrical glass base material to assume a prescribed outer diameter, and then cutting it to prescribed lengths, and polishing the cut faces thereof.

2. A method for manufacturing a dosimeter glass element which generates fluorescence corresponding to the radiation exposure dose thereof upon excitation by ultraviolet light, comprising:

heating and extending a prismatic glass base material until the thickness of one side thereof assumes a prescribed thickness, and then cutting it to prescribed lengths, and polishing the cut faces thereof.

3. A dosimeter glass element which generates fluorescence corresponding to the radiation exposure dose thereof upon excitation by ultraviolet light, wherein the dosimeter glass element has been manufactured by heating and extending a cylindrical glass base material to assume a prescribed outer diameter, and then cutting it to prescribed lengths, and polishing the cut faces thereof.

4. A dosimeter glass element which generates fluorescence corresponding to the radiation exposure dose thereof upon excitation by ultraviolet light, wherein the dosimeter glass element has been manufactured by heating and extending a prismatic glass base material until the thickness of one side thereof assumes a prescribed thickness, and then cutting it to prescribed lengths, and polishing the cut faces thereof.

5. A dosimeter holder provided so as to be able to accommodate internally a dosimeter element which generates fluorescence corresponding to the radiation exposure dose thereof, comprising:

an indication of a fluorescence reading position of said dosimeter element being provided on the outer surface of the dosimeter holder.

6. The dosimeter holder according to claim 5, wherein the indication of said fluorescence reading position includes an indication of the fluorescence reading center thereof.

7. The dosimeter holder according to claim 5, wherein the indication of said fluorescence reading position includes an indication of the fluorescence reading range thereof.

8. The dosimeter holder according to claim 5, wherein the indication of said fluorescence reading position is printed by means of alcohol-resistant ink.

9. The dosimeter holder according to claim 5, being formed from ABS resin.

10. The dosimeter holder according to claim 6, wherein the indication of said fluorescence reading position includes an indication of the fluorescence reading range thereof.

11. The dosimeter holder according to claim 6, wherein the indication of said fluorescence reading position is printed by means of alcohol-resistant ink.

12. The dosimeter holder according to claim 7, wherein the indication of said fluorescence reading position is printed by means of alcohol-resistant ink.

13. The dosimeter holder according to claim 6, being formed from ABS resin.

14. The dosimeter holder according to claim 7, being formed from ABS resin.

15. The dosimeter holder according to claim 8, being formed from ABS resin.

* * * * *